(12) United States Patent　(10) Patent No.: US 9,781,903 B2
Jarvis　(45) Date of Patent: Oct. 10, 2017

(54) SIMULATED ANIMAL FEEDING DEVICE

(71) Applicant: Terry S. Jarvis, Whiteville, TN (US)

(72) Inventor: Terry S. Jarvis, Whiteville, TN (US)

(*) Notice: Subject to any disclaimer, the term of this patent is extended or adjusted under 35 U.S.C. 154(b) by 0 days.

(21) Appl. No.: 14/756,027

(22) Filed: Jul. 22, 2015

(65) Prior Publication Data

US 2016/0029595 A1　Feb. 4, 2016

Related U.S. Application Data

(60) Provisional application No. 61/999,532, filed on Jul. 29, 2014.

(51) Int. Cl.
*A01K 15/02*　(2006.01)
*A01K 29/00*　(2006.01)
*A01K 5/01*　(2006.01)

(52) U.S. Cl.
CPC .............. *A01K 15/02* (2013.01); *A01K 5/01* (2013.01); *A01K 15/028* (2013.01); *A01K 29/00* (2013.01)

(58) Field of Classification Search
CPC ...... A01K 5/0114; A01K 5/01; A01K 5/0128; A01K 15/02
USPC .............. 119/51.01, 65, 61.1, 61.5, 707, 712
See application file for complete search history.

(56) References Cited

U.S. PATENT DOCUMENTS

| | | | |
|---|---|---|---|
| 1,065,823 A * | 6/1913 | Matthews | G01F 11/286 15/257.05 |
| 2,601,767 A * | 7/1952 | Wall | A47G 19/2261 220/603 |
| 3,589,340 A * | 6/1971 | Beliles | A01K 5/01 119/61.54 |
| 3,951,107 A | 4/1976 | Doty | |
| 4,040,389 A | 8/1977 | Walters | |
| 4,153,010 A | 5/1979 | Erfeling | |
| D259,967 S | 7/1981 | Ramsey | |
| 4,363,291 A | 12/1982 | Harmsen | |
| 4,389,976 A | 6/1983 | Novak | |
| 4,399,772 A | 8/1983 | Salinas | |
| 4,653,431 A | 3/1987 | Owen | |
| 4,688,520 A | 8/1987 | Parks | |
| 4,714,985 A * | 12/1987 | Hickey | A45C 1/00 362/154 |
| 4,820,527 A | 4/1989 | Christensen et al. | |
| 4,825,811 A | 5/1989 | O'Kelley | |
| 4,829,935 A | 5/1989 | Gray | |
| 4,896,628 A | 1/1990 | Kadunce | |
| 4,981,108 A | 1/1991 | Faeroe | |
| 4,987,858 A | 1/1991 | Curtis et al. | |
| 5,050,770 A | 9/1991 | Smiley | |
| 5,105,766 A | 4/1992 | Montgomery | |
| 5,105,769 A | 4/1992 | Smith et al. | |
| 5,107,795 A | 4/1992 | Curtis et al. | |
| 5,144,912 A | 9/1992 | Hammett et al. | |

(Continued)

*Primary Examiner* — Yvonne Abbott-Lewis
(74) *Attorney, Agent, or Firm* — Paul M. Denk

(57) ABSTRACT

An animal feeding pail comprising a bucket, the bucket having an upward handle, the bucket having a sidewall, extending around its circumference, and a bottom secured proximate the bottom of its sidewall, a false bottom wall provided within the bucket, and biasing against the interior of the side wall, to create a volumetric space between it and the bucket bottom wall, and into which granular material may be located to simulate the sound of animal feed when the bucket is shaken.

12 Claims, 2 Drawing Sheets

(56) References Cited

U.S. PATENT DOCUMENTS

| | | | | |
|---|---|---|---|---|
| 5,188,063 | A * | 2/1993 | Evans | A01K 1/0107 119/165 |
| 5,241,924 | A | 9/1993 | Lundin et al. | |
| 5,333,571 | A | 8/1994 | Re et al. | |
| 5,555,843 | A | 9/1996 | Harmon | |
| 5,855,184 | A | 1/1999 | Eichler et al. | |
| 5,870,969 | A | 2/1999 | Boyce | |
| 5,887,544 | A * | 3/1999 | Popelier | A01K 5/01 119/61.54 |
| 5,894,815 | A | 4/1999 | Hamilton | |
| D421,821 | S | 3/2000 | Kinjerski | |
| 6,374,773 | B1 | 4/2002 | McIntyre et al. | |
| 6,510,813 | B1 | 1/2003 | Boone, Jr. | |
| 6,681,718 | B1 | 1/2004 | McIlarky | |
| 6,761,129 | B1 | 7/2004 | Smith | |
| 7,036,455 | B2 | 5/2006 | Loewe | |
| 7,051,675 | B1 | 5/2006 | Mayer et al. | |
| 7,055,462 | B2 | 6/2006 | Keller | |
| 7,228,816 | B2 | 6/2007 | Turner et al. | |
| 7,426,901 | B2 | 9/2008 | Turner et al. | |
| 7,458,338 | B2 | 12/2008 | Keller | |
| 7,523,717 | B2 | 4/2009 | Nicholes | |
| 7,753,000 | B1 * | 7/2010 | Turner | A01K 5/01 119/57 |
| 7,882,804 | B2 | 2/2011 | Szutu | |
| D636,943 | S | 4/2011 | Pilz | |
| 8,151,731 | B2 | 4/2012 | McIntyre | |
| 8,225,747 | B2 * | 7/2012 | Markham | A01K 15/025 119/51.01 |
| 8,251,014 | B2 * | 8/2012 | Hamilton | A01K 5/01 119/61.1 |
| 8,342,128 | B2 * | 1/2013 | Rocker | A01K 5/0114 119/61.2 |
| 8,353,505 | B2 | 1/2013 | Kaneko et al. | |
| 8,375,895 | B2 * | 2/2013 | Omps | A01K 1/0114 119/166 |
| 8,381,684 | B2 * | 2/2013 | Crawford | A01K 5/01 119/61.1 |
| 8,459,207 | B2 | 6/2013 | Ertek | |
| 8,522,722 | B2 | 9/2013 | Pastoor et al. | |
| 8,573,156 | B2 | 11/2013 | Gates | |
| 8,579,459 | B2 * | 11/2013 | Ma | A45C 3/00 362/156 |
| 8,674,268 | B2 * | 3/2014 | Clark, Jr. | A01K 7/027 119/73 |
| 8,701,595 | B2 | 4/2014 | Jin et al. | |
| 8,887,665 | B2 * | 11/2014 | Rocker | A01K 5/0128 119/61.2 |
| 9,301,504 | B2 * | 4/2016 | Wurth | A01K 15/025 |
| 2010/0083904 | A1 * | 4/2010 | Pu | A01K 15/025 119/51.03 |
| 2012/0167827 | A1 * | 7/2012 | Rochon | A01K 5/0114 119/51.01 |
| 2013/0112149 | A1 * | 5/2013 | Robbins | A01K 1/0114 119/166 |
| 2014/0000529 | A1 * | 1/2014 | Sunvold | A01K 15/02 119/702 |
| 2015/0245588 | A1 * | 9/2015 | Perorazio | A01K 1/0114 119/166 |

* cited by examiner

SIMULATED ANIMAL FEEDING DEVICE

CROSS REFERENCE TO RELATED APPLICATION

This regular letters patent application claims priority to the provisional patent application having Ser. No. 61/999,532 filed on Jul. 29, 2014.

FIELD OF THE INVENTION

This invention relates to the usage of a pail, one that may be used to hold animal feed, but which includes a false bottom into which feed, or other granular material may insert, which when the pail is shaked, stimulates the attention of animals, particularly the horse, attracting it to the pail thinking that feed is readily available for consumption.

This invention does relate to an animal feeding pail, which can also generate a substantial sound similar to animal feed being located in a pail, to act as an attractant to cause the animals, such as horses, cows, or other barnyard animals, to come running, thinking that a meal is about to be served.

Frequently, when animals escape the corral, or when they are out in the field or pasture, such as a herd of horses, or a pack of cows, they may be as much as a fraction or more of a mile away, and trying to round them up for corralling, or for putting them into stalls for the night, can be a major task. The object of the current invention is to provide an attractant, which can stimulate the interests of the distant animals, to get them to come running, so they can be more easily corralled, penned, or even brought into the vicinity for feeding, with little effort.

Various prior art devices have been available for use for handling of pets, such as can be seen in the patent to Jin, et al, U.S. Pat. No. 8,701,595, disclosing a pet food dispenser. Obviously, the pet or animals are already within the vicinity of the dispenser, awaiting to be fed.

The patent to Gates, U.S. Pat. No. 8,573,156, shows a dual hopper animal feeder device.

The patent to Pastoor, et al, U.S. Pat. No. 8,522,722, shows a device for feeding animals, which includes a frame that restricts the feeding area to a single animal.

U.S. Pat. No. 8,459,207, to Ertik, shows an animal feeding apparatus, having an outside body and an inside unit, primarily constructed to solve the hygiene issue and to minimize continuous cleaning.

The patent to Crawford, U.S. Pat. No. 8,381,684, shows another animal feeding bowl. It includes a false bottom to facilitate draining of cleaning water from the bowl, after usage.

The patent to McIntyre, U.S. Pat. No. 8,151,731, shows another form of animal feeder. It is a dual compartment type of feeder.

U.S. Pat. No. 7,882,804, shows a pet food dispenser.

The patent to Nicholes, U.S. Pat. No. 7,523,717, shows another style of animal feeder apparatus.

U.S. Pat. No. 7,426,901, to Turner, et al, shows an animal feeding device and method, which appears to be rather electronically controlled for automating the feeding system for pets with special diets.

U.S. Pat. No. 7,051,675, shows another electro/mechanical device for an automatic animal feeder.

U.S. Pat. No. 6,681,718, shows another animal feeding device.

The patent to McIntyre, U.S. Pat. No. 6,374,773, shows another form of animal feeding device that either can be handheld or be anchored to another structure.

U.S. Pat. No. 5,894,815, shows a boredom-reducing feeding device for caged animals, which also looks towards the behavioral aspects of the animal, through usage of this feeding device. As previously commented, applicant's device is used as an attractant, to the animals, to get them to come to corralling, locating in a barn, or for feeding, and therefore, works upon the instincts of the animal to follow what it believes to be a pail of feed, to achieve movement.

U.S. Pat. No. 5,107,795, shows another animal feeding device.

U.S. Pat. No. 5,105,769, shows an animal feeding device wherein it incorporates a bowl, and a tray, in its structure.

U.S. Pat. No. 5,105,766, shows what is identified as a bucket, which is to be suspended out in the woods, wherein the animal when it nudges a feeder rod, can attain a flow of feed from its container, during usage. The bucket also shows the application of a lid thereon.

The patent of Smiley, U.S. Pat. No. 5,050,770, shows a method an apparatus for delivering particulate material, for a material delivering device.

U.S. Pat. No. 4,981,108, shows another animal feeding dish.

U.S. Pat. No. 4,896,628, shows an animal feeding device, with a series of food distribution couplings.

U.S. Pat. No. 4,829,935, shows an animal feeding device that appears to include a couple of compartments.

U.S. Pat. No. 4,825,811, shows an animal feeding device where excess feed can fall from its hopper into a bottom trough.

U.S. Pat. No. 4,363,291, shows an automated cattle feeding device.

U.S. Pat. No. 6,510,813, shows another animal feeding device including a feed bucket.

U.S. Pat. No. 5,887,544, shows a feed saving insert for animal feed buckets. This shows a bucket with a moveable disk that apparently floats upon the surface of the feed during animal or horse feeding.

U.S. Pat. No. 5,870,969, shows a feeding container with sliding cover lid and feeder cage, wherein the lid includes a handle.

These are examples of the myriad of a variety of animal feeding devices that are available in the art.

SUMMARY OF THE INVENTION

This invention contemplates the revised structure in a feeding pail for use for enticing animals, particularly the horse, to its location when the pail containing granular material is shaken, to alert the animal that feed may be present, as an attractant to get the animal to come towards the horseman, as desired. Essentially, the concept of this invention is to provide a pail, with a false bottom, and into which food material, granular material, or extruded animal feed, may be located, which when the pail is shaken, the horse, which may be far off in the distance, will hear the same, and come running thinking that feeding time has arrived.

Essentially, when the herd of horses, or even for that matter cows or other farmyard animals, are out in the pasture, and it is time to corral them, or locate them in the barn for nighttime, it is a difficult task to get them to move towards the rancher or farmer, unless there is some enticement involved. This invention includes the use of a pail, of a size that may be within the range of approximately ten inches high, ten to twelve inches in diameter, and which incorporates an insert bottom, or false bottom, that may bind approximately two inches up from the bottom of the pail, along the sloped interior continuous walls of the pail, so that attractant material, whether it be extruded chow, horse feed, cow feed, or even granular material, or even a supply of BBs, will be located within that false bottom segment, the inner false lid is located in place, so that the deposited material will remain, even though the bucket may be turned to the side, turned over, dropped, or the like. But, when the rancher shakes the bucket, the granular material will impinge upon the metallic or plastic sides of the bucket, and its bottom and false lid, and give off a sound resembling the presence of animal feed, to get the animals to promptly come to the rancher, for further handling.

Particularly with respect to the handling of horses, the bucket will have its false bottom, and its shakable material therein, and horse feed may be located in the upper part of the bucket, when it is initially used, so that the horses will become attuned to coming to the sound of the rattling feed, and then be fed some feed from the bucket, to develop an instinct for the horse to believe that feed will always be available, when the feed rattling sound is generated, and will come directly to the horseman or rancher, when the bucket is used in this fashion. In other words, this device operates off of the stimulus and response concept. The rancher then can continue the sound and walk the horses directly into the barn, without having to move or drive all over the field, in an effort to try and corral them, for the evening, or for feeding.

Once the horse or other animal has become attuned to responding to the sound of the shaken bucket, it will come automatically, regardless whether any feed or other material is located within the bucket, during usage as an attractant. Experience has shown that horses, in particular, can pick up the sound of the rattling bucket from as far as a half mile away, which saves the rancher a lot of time and effort in trying to round up and corral the horse(s) when such is required.

The bucket, may be of a standard design, such as made out of metal, or a galvanized metal, or it can even be formed of plastic, to achieve its intended results when assembled including its false bottom, that holds the granular material therein. The false bottom can be soldered, welded, or even glued in place when formed. There may even be a handle provided upon the false bottom, so it can be lifted out, when it may be necessary to replace the granular material, or extruded feed, and in this manner the lid can be conveniently rearranged to form the false bottom, after new material has been located therein.

The inventor has even used this bucket out of the field, even while sitting in his truck, by simply extending it out the vehicle window, shaking it, with the horses immediately being attracted to the fence, or nearby, where the vehicle locates, as the bucket is being used.

Is there, therefore, the principal object of this invention to provide a bucket, with a false bottom, and into which granular material may locate, so that when the bucket is shaken, it psychologically induces the horse(s) or other animals to get their attention, and come towards the direction of the sound of a pail full of feed material, as required.

Still another object of this invention is to provide a pail with a false bottom, that is removable, and into which granular or extruded chow may be located, such that when the pail is shaken, it generates an extensive sound of animal feed, to immediately attract the animals to the user of the pail, during its application.

Still another object of this invention is to provide a pail with a removable false bottom, so that granular material located therein can be replaced, as desired.

Yet another object of this invention is to provide a feeding pail that can generate sounds that psychologically alert the farmyard animals, such as horses, to be attracted to the pail thinking that a feeding time has arrived.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 1:
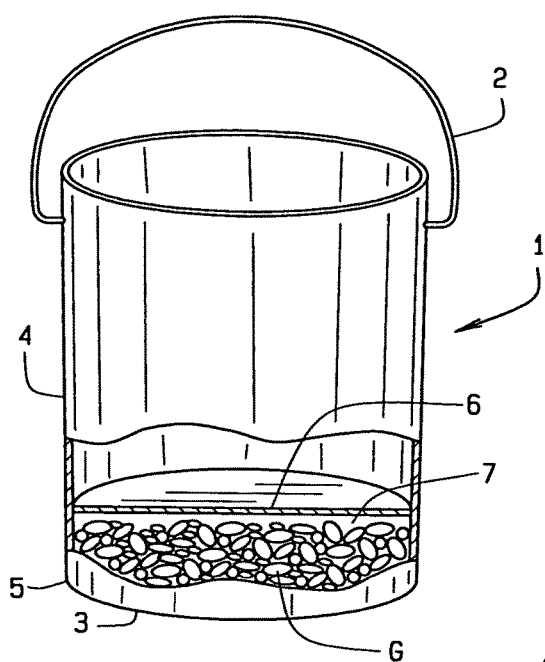
FIG. 1 provides an isometric view of the versatile animal feeding pail of this invention.

In referring to the drawings, and in particular FIG. 1, there is shown a bucket or pail 1 having a carrying handle 2 pivotally mounted thereto, as known in the art. The bottom of the bucket 3 spans across the lower portion of the sidewall 4 and usually there is a short extension 5 below the bottom of the formed bucket. In this particular instance, there is a false bottom 6 provided spacedly upwardly, approximately two or more inches, in order to leave a volumetric capacity 7 between the bottom 3, and the false bottom 6, as can be noted. The entire bucket can be molded in place with the bucket when formed, when made of polymer. It is in this space that the granular material, such as at G, may locate, and such material, as previously summarized, may be pebbles, small rocks, B-Bs, or even extruded animal feed or chow, or other animal feed. Essentially, the granular material G will only take up a portion of the space of the volume 7, so that there is room for it to be shaken, within the false bottom, to give off a sound that may emulate the existence of animal feed, for the purpose of attracting the animals, whether they be horses, cows, or other farm animals, as previously reviewed.

Figure 2:
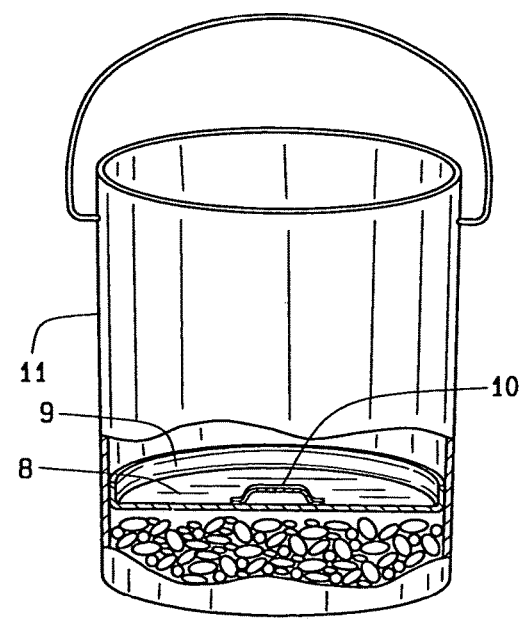
FIG. 2 shows a slight modification to the animal feeding pail of this invention.

As can be seen in FIG. 2, the false bottom 8 may have a short upstanding flange 9 around its circumference, and further includes a handle 10 so that the false bottom can be lifted upwardly, and removed, when it is necessary to replenish or replace the granular material G located therein. As can be seen, the side of the bucket 11 has a slight slope, that narrows towards the bottom, so that the flange 9 of the bottom 8, which also has a slight slope, will bind against the interior surface of the wall 11, to locate it into position, and hold it there, as the pail is being used in a rattling motion, to generate the type of sound that will attract the animals to the rancher, during usage of this device.

Figure 3:
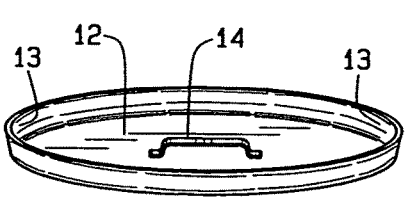
FIG. 3 shows the false bottom before it is installed into its bucket or pail of this invention.

FIG. 3 shows the false bottom 12 prior to its application within the bucket 11, and it can be noted that its bottom includes the integral flange 13 provided around its perimeter, and it has essentially the same angle of slant as the bucket 11, itself. Thus, when one prepares the animal feeding device for usage, and locates the granular material G therein, he/she can grab the false bottom by the handle 14 and wedge it down into the bucket, to come to the location in preparation for usage, as can be seen in FIG. 2. Then, the animal attracting pail is ready for usage.

Also, where the false bottom and the bucket may be made of metal, the false bottom could be welded or sautered in place, for permanent usage. Or, where they may be made of polymer, then an adhesive may be applied around the flange 13 to permanently secure the false within the shown bucket, also in preparation for usage.

Hence, it is the essence of this invention to provide a means, such as a pail, having a false bottom, that emulates the sounds of animal feed being present, that it may be subject to pouring into a feed pen, trough, or feeding pail, to act as an attractant to get the farm animals to come from a distance, out on the range or pasture, to the site of the shaken pail, to greatly assist the farmer or rancher in leading such animals to corral, or into the barn, for the evening, or for other purposes. It has been found that through repeat usage of this invention, particularly when some feed may be contained within the pail at the beginning, and fed to the animal when they come up to the farmer, that this designed pail is quite effective in consistently bringing the animals to a pen, barn, or other location where the farmer desires their location.

Figure 4:
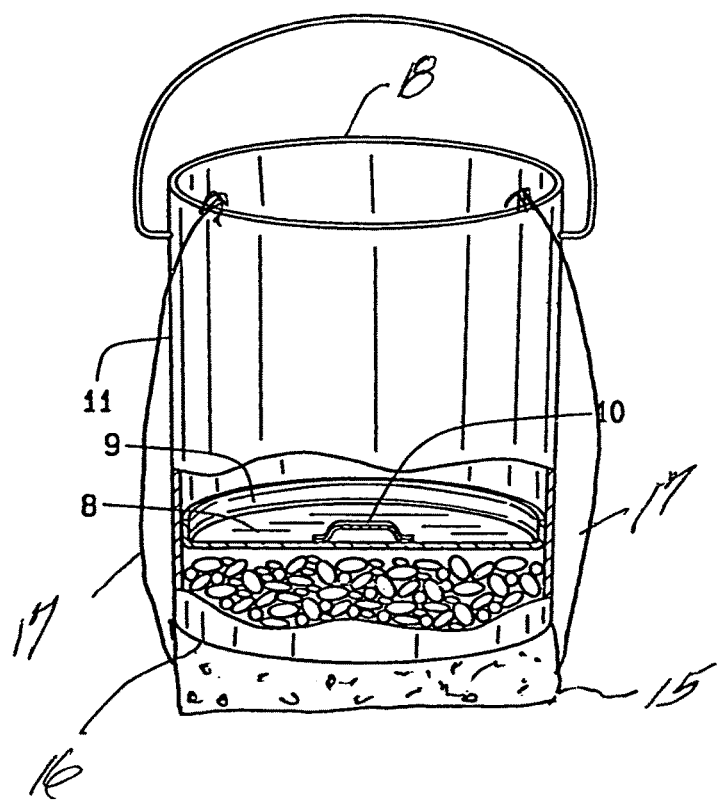
FIG. 4 shows how a supplemental false bottom can be added to a standard pail, and secured in position, to provide the same results of this invention.

FIG. 4 shows a variation upon the invention, where a false bottom 15 may be secured onto the bottom of the shown bucket 11, and it may have the various granular located therein, within the false bottom, but beneath the bottom 16 of the shown bucket. Then, strap 17 maybe applied for securing on to the top edge 18 of the bucket, to affix the false bottom to the bottom of the shown bucket. The strap 17 may be elastic, to aid in the securement of the false bottom in place.

Variations or modifications of the subject matter of this invention may occur to those skilled in the art upon review of the invention as described herein. Such variations, if within the spirit and scope of this invention, are intended to be encompassed within the scope of any claims to patent protection issuing hereon. The summarization of the invention as previously provided, its explanation in the description of the preferred embodiment, and its depiction in the drawings, are set forth for illustrative purposes only.

I claim:

1. An animal attracting pail for use in simulating the sound of a bucket full of animal feed, which when shaken, attracts the animal from a distance to the user; comprising:
    a bucket, said bucket having side walls and a bottom wall, a false bottom wall provided upwardly from the bottom of the bucket, to provide a volumetric space in which granular material is inserted, said false bottom wall has an upper surface, and a handle securing with the upper surface to facilitate the removal and insertion of the false bottom wall within the bucket during its usage, and said bucket, which when shaken, simulates and attracts the attention of the animal to approach the user in the expectation of being fed feed.

2. The animal feeding pail of claim 1, wherein said bucket is formed of metal.

3. The animal feeding pail of claim 2, wherein said metal bucket comprises galvanized metal.

4. The animal feeding pail of claim 2, wherein said false bottom is secured to the bucket in which it locates.

5. The animal attracting pail of claim 4, wherein the false bottom is welded to the bucket.

6. The animal feeding pail of claim 4, wherein the false bottom is soldered to the bucket.

7. The animal feeding pail of claim 4, wherein the false bottom is adhesively secured within the bucket.

8. The animal feeding pail of claim 1, wherein said bucket is formed of a polymer.

9. An animal attracting pail containing a supply of granular material and for use in simulating the sound of a bucket full of animal feed, which when shaken, attracts the animal from a distance to the user, comprising:
    a bucket, said bucket having side walls and a bottom wall, a false bottom wall provided downwardly from the bottom of the bucket, and disposed for securement to the bottom of the bucket, to provide a volumetric space in which granular material is inserted, said false bottom wall and said bucket bottom wall containing the granular material therein when secured together, and said bucket containing the granular material, which when shaken, simulates and attracts the attention of the animal to approach the user in the expectation of being fed the animal feed.

10. The animal feed bucket of claim 9, and including straps for holding the false bottom onto the bottom of the said bucket, and said straps securing to the top edge of said bucket, to affix the false bottom in place during usage.

11. An animal attracting pail containing a supply of granular material for use in simulating the sound of a bucket full of animal feed, which when shaken, attracts the animal from a distance to the user; comprising:
    a bucket, said bucket having side walls and a bottom wall, a false bottom wall provided upwardly from the bottom of the bucket, and secured to said bucket, to provide a volumetric space in which granular material is inserted, said false bottom wall and said bucket bottom wall containing said granular material therein when secured together, and said bucket, containing said granular material, which when shaken, simulates and attracts the attention of the animal to approach the user in the expectation of being fed animal feed; and
    wherein said upwardly disposed false bottom wall includes a bottom wall having a dimension larger than the existing bottom wall of the bucket, and said false bottom wall capable of being inserted and secured together into the bucket, and wedging against the interior of its side wall, to provide the volumetric space in which the granular material may be located.

12. The animal feeding pail of claim 11, wherein said bucket has an outward slant as its outer wall extends upwardly from its bottom, and the false bottom wall having a flange extending around its perimeter, and having the same slant as the wall of the bucket, such that when the false bottom wall is inserted into the bucket its flange biases against the interior slanted wall of the bucket, to form a volumetric space between the false bottom wall and the bottom wall of the bucket, to form the said space for insertion of granular material therein.

* * * * *